United States Patent [19]
Brackett

[11] Patent Number: 5,456,159
[45] Date of Patent: Oct. 10, 1995

[54] MOTION CONVERTER WITH PINION SECTOR/RACK INTERFACE

[76] Inventor: Douglas C. Brackett, 2535 Mason Oaks Dr., Valricho, Fla.

[21] Appl. No.: 317,243

[22] Filed: Oct. 3, 1994

Related U.S. Application Data

[63] Continuation-in-part of PCT/US93/07026, Jul. 30, 1993, which is a continuation-in-part of Ser. No. 924,547, Jul. 31, 1992, Pat. No. 5,259,256.

[51] Int. Cl.$^6$ ........................................ F01B 9/00
[52] U.S. Cl. .................... 92/138; 92/147; 74/49; 74/50; 123/55.7; 384/2; 384/154
[58] Field of Search ................ 92/153, 138, 72, 92/147; 384/2, 154; 74/49, 50; 123/55.5, 55.7, 197.4

[56] References Cited

U.S. PATENT DOCUMENTS

| | | |
|---|---|---|
| 5,741 | 8/1848 | McLaughlin . |
| 34,400 | 2/1862 | Barden . |
| 116,417 | 7/1871 | McCamy . |
| 130,371 | 8/1872 | Hendrya . |
| 139,499 | 6/1873 | Doolittle . |
| 185,521 | 12/1876 | Gregersen . |
| 347,644 | 8/1886 | Salmon . |
| 410,432 | 9/1889 | McKaig . |
| 508,387 | 11/1893 | Humphries . |
| 637,450 | 11/1899 | Doolittle . |
| 671,583 | 4/1901 | Carmack . |
| 735,743 | 8/1903 | Fowler . |
| 762,646 | 6/1904 | Morison . |
| 795,244 | 7/1905 | Armstead . |
| 813,736 | 2/1906 | Pendleton . |
| 999,220 | 8/1911 | Harmon . |
| 1,687,425 | 10/1928 | Briggs . |
| 1,825,096 | 9/1931 | Schwemlein ........................ 384/154 |
| 2,312,057 | 2/1943 | Williams . |
| 2,366,237 | 1/1945 | Clausen . |
| 2,628,602 | 2/1953 | Butterfield . |
| 3,035,793 | 5/1962 | Ralph et al. . |
| 3,195,420 | 7/1965 | Johannsen ............................. 74/49 |
| 3,386,429 | 6/1968 | Trammel . |
| 3,451,276 | 6/1969 | Wadlow et al. . |
| 3,945,358 | 3/1976 | Collins . |
| 4,270,395 | 6/1981 | Grundy . |
| 4,331,108 | 5/1982 | Collins . |
| 4,339,960 | 7/1982 | Senft . |
| 4,485,768 | 12/1984 | Heniges . |
| 4,485,769 | 12/1984 | Carson . |
| 4,543,919 | 10/1985 | Carson . |

(List continued on next page.)

FOREIGN PATENT DOCUMENTS

| | | |
|---|---|---|
| 61-241518 | 10/1986 | Japan . |
| 52799 | 12/1920 | United Kingdom . |
| 533047 | 2/1941 | United Kingdom . |

OTHER PUBLICATIONS

New-Wave Two Stroke, Scott, Popular Science, Jan. 1990.
SAE Technical Paper No. 901532, Aitken et al., Aug. 13, 1990 The CMC Scotch Yoke Engine-A Family of Engines For Automotive Use.
SAE Technical PaperNo. 920675, Close et al., Feb. 24, 1992 The New Collins Compact Scotch Yoke Engine.
International Publication No. WO94/03740, 17 Feb. 1994 Brackett, Douglas C.

*Primary Examiner*—Thomas E. Denion
*Attorney, Agent, or Firm*—Ralph W. Selitto, Jr.

[57]   ABSTRACT

A device for translating rotary to linear motion and vice versa includes a reciprocating linearly moving shuttle with a central aperture. The aperture has a pair of opposing conjugate bearings protruding towards the center and which capture therebetween a pair of conjugate drivers rotatably mounted to the crankpin of a rotatable crankshaft with the axis of crankshaft rotation perpendicular to the linear path of the shuttle. The conjugate drivers are free to rotate about the crankpin and articulate independently of each other through a selected angular range. When the crankpin, including the conjugate drivers, is inserted into the aperture of the shuttle with the conjugate drivers engaging the racks, motion is transferable between the crankpin and the shuttle through the conjugate drivers.

20 Claims, 12 Drawing Sheets

U.S. PATENT DOCUMENTS

| | | |
|---|---|---|
| 4,658,768 | 4/1987 | Carson . |
| 4,685,342 | 2/1987 | Brackett .......................................... 74/50 |
| 4,685,342 | 8/1987 | Brackett . |
| 4,779,472 | 10/1988 | Brackett . |
| 4,856,917 | 8/1989 | Schroder et al. ........................... 384/2 |
| 4,887,560 | 12/1989 | Heniges . |
| 4,932,373 | 6/1990 | Carson . |

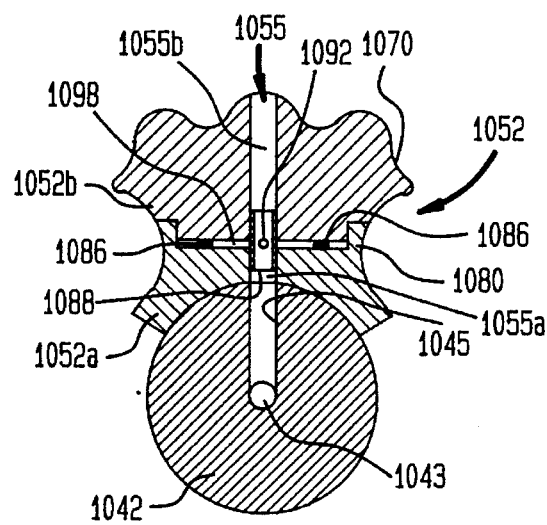
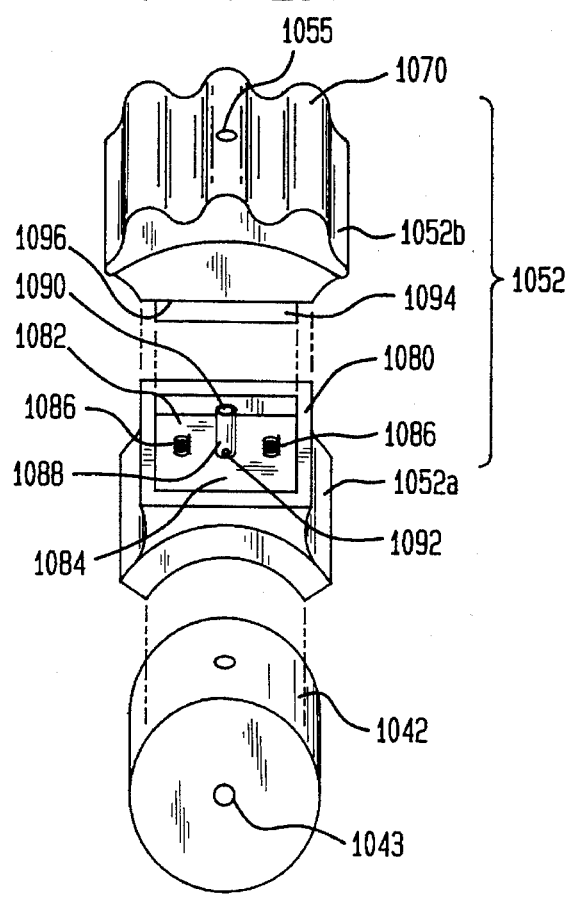
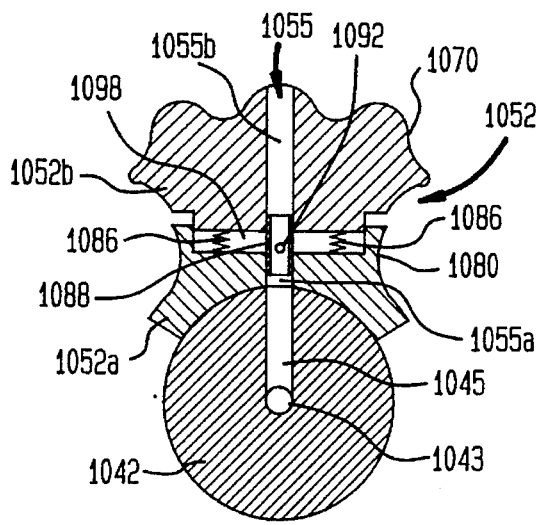

MOTION CONVERTER WITH PINION SECTOR/RACK INTERFACE

CROSS REFERENCE TO RELATED APPLICATIONS

This is a continuation-in-part of International Appln. No. PCT/US93/07206 filed Jul. 30, 1993, which has been converted into U.S. application Ser. No. 08/374,725 filed Jan. 26, 1995 and which is a continuation-in-part of U.S. application Ser. No. 07/924,547 filed Jul. 31, 1992, now U.S. Pat. No. 5,259,256.

FIELD OF THE INVENTION

The present invention relates to devices for converting linear motion to rotary motion and vice versa, and., more particularly, to a conjugate drive motion translator.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder, see, e.g., U.S. Pat. Nos. 283,558, 813,736, 999,220, and 2,628,602, as well as, in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear and vice versa (i.e., there is no translation during traversal of the clearance gap), and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

A variety of methods have been proposed to simultaneously achieve minimum crankpin to slot clearance and friction. For example, in U.S. Pat. No. 1,687,425 a spring urged lever presses against the crankpin to eliminate excess clearance. In U.S. Pat. No. 2,366,237 the shuttle includes a bearing block having a center roller bearing for the crankpin and side roller bearings to reduce friction between the block and the remainder of the shuttle. U.S. Patent No. 4,685,342 to Douglas C. Brackett, the inventor herein, entitled DEVICE FOR CONVERTING LINEAR MOTION TO ROTARY MOTION OR VICE VERSA, discloses a scotch yoke type device having a pair of opposing, offset bearing surfaces, one on either side of the crankpin slot in the shuttle. A corresponding pair of roller bearings are arranged on the crankpin coaxially and laterally displaced from one another such that each aligns with one of the pair of opposing, offset bearing surfaces of the slot within which the crankpin is positioned. In this manner, clearance at the crankpin/slot interface can be minimized to manufacturing tolerances and friction is reduced to the rolling friction of a roller bearing.

Whereas different motion translation applications have varying requirements with respect to loading stresses, materials, cost, etc., it remains an objective in the art to create new motion translator designs having alternative structural and functional characteristics while achieving energy efficiency and wear resistance. It is therefore an object of the present invention to provide an alternative motion translator mechanism to a scotch yoke which tends to simultaneously minimize clearance and friction between the crankpin and the shuttle slot but which also retains the benefits of a scotch yoke design.

SUMMARY OF THE INVENTION

The problems and disadvantages associated with conventional scotch yoke devices utilized for translating rotary to linear motion and vice versa are overcome by the present invention which includes a shuttle adapted to move along a linear path and having an aperture therein. At least a portion of the peripheral boundary of the aperture defines a trackable profile. A pair of tracking sectors are rotatably mounted to the crankpin of a rotatable crankshaft such that the sectors rotate about the crankpin and articulate independently through a selected range of arcuate motion. The crankpin, including the tracking sectors, is positioned within the shuttle aperture with the tracking sectors engaging the trackable profile such that motion is transferable between the crankpin and the shuttle through the tracking sectors.

BRIEF DESCRIPTION OF THE DRAWINGS

For a better understanding of the present invention, reference is made to the following detailed description of various exemplary embodiments considered in conjunction with the accompanying drawings, in which:

FIG. 20 is an exploded, perspective view of an eleventh exemplary embodiment of the present invention;

FIG. 21 is a cross-sectional view of the eleventh exemplary embodiment of the present invention, the embodiment being shown in a retracted position;

FIG. 22 is a cross-sectional view of the eleventh exemplary embodiment of the present invention, the embodiment being shown in an extended position.

DESCRIPTION OF THE EXEMPLARY EMBODIMENTS

Although the present invention is applicable to any machine which utilizes a scotch yoke or other rotary/rectilinear motion translator like a slider crank arrangement, examples of which are mentioned above, it will be explained herein in terms of its application to a reciprocating piston device, such as an internal combustion engine or a compressor.

Figure 1:
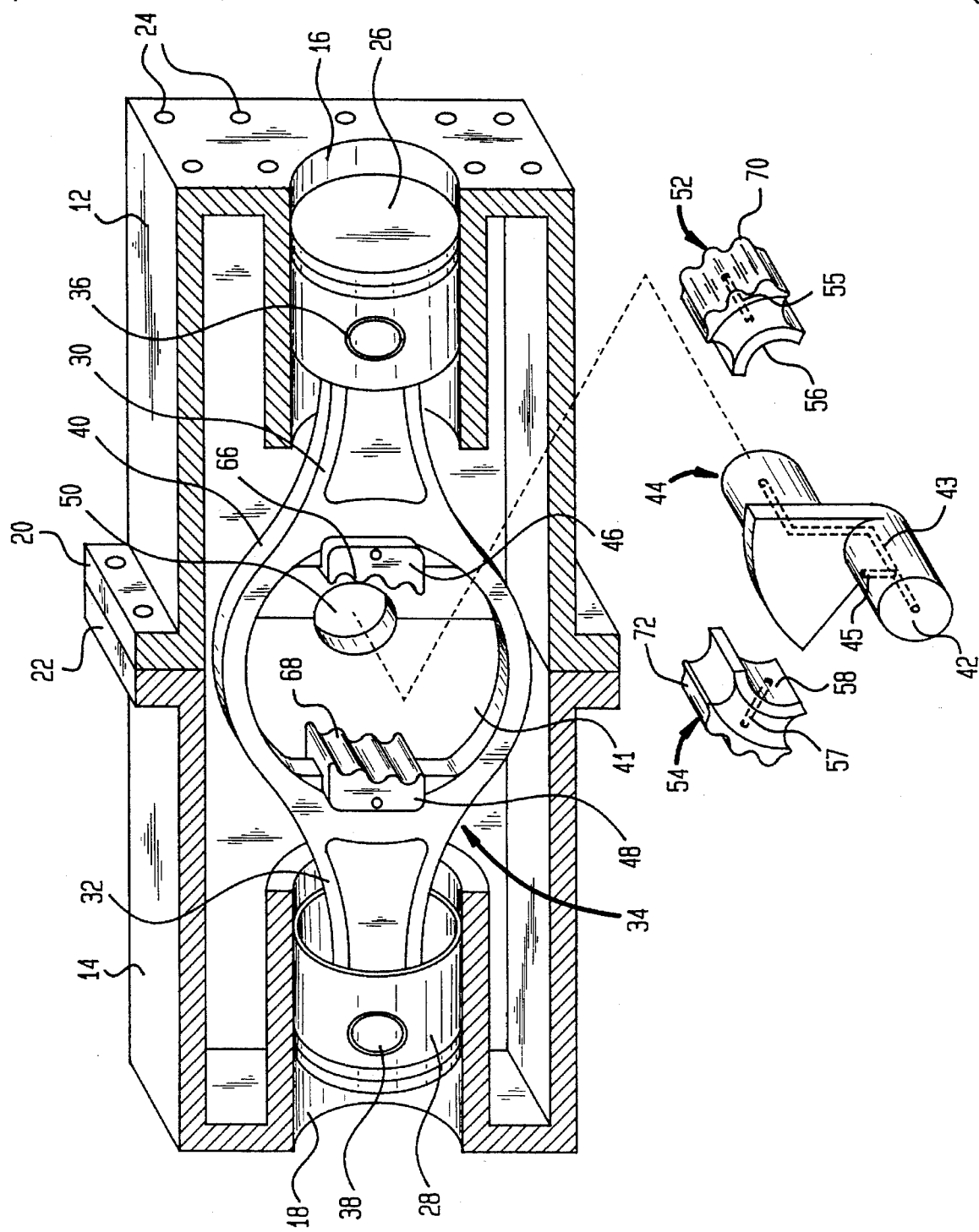
FIG. 1 is an exploded, cutaway, perspective view of a reciprocating piston device employing a first exemplary embodiment of the present invention.

FIG. 1 shows a piston device 10 with a pair of cylinder blocks 12, 14, each of which has a cylinder bore 16 and 18, respectively. The blocks 12, 14 would be joined together via opposing flanges 20, 22 by bolts etc. or by studs extending through the blocks and projecting from holes 24 for securing a cylinder head (not shown) via suitable nuts (not shown) as would be conventional in constructing cylinder blocks with opposed cylinders. The cylinder bores 16 and 18 receive corresponding pistons 26 and 28 which are mounted upon the terminal ends of extensions 30 and 32 of shuttle 34 by wrist pins 36 and 38 or other conventional means. The extensions 30 and 32 emanate from a common yoke portion 40 of the shuttle 34.

The yoke portion 40 is provided with an aperture 41 which accommodates a crankpin 42 of crankshaft 44. The internal peripheral boundary of the aperture 41, instead of simply being a smooth slot, includes a pair of opposing conjugate bearings/bearings conjugate or "racks" 46 and 48 on either side thereof. In the embodiment depicted, the conjugate bearings 46, 48 are a pair of discrete elements, each being bolted to the shuttle 34 on opposing sides of the aperture 41. Alternatively, the conjugate bearings 46, 48 could be defined by an apertured plate or plates secured to or integral to the shuttle 34, the aperture being formed such that the interior periphery defines the conjugate bearings 46 and 48. It should be appreciated that while the aperture 41 passes completely through the shuttle 34, it is possible to replace the aperture 41 with a recess or blind hole. For example, in the device shown in FIG. 1, if the yoke portion 40 were closed by a continuous metal surface on the side closest to the viewer, a recess facing toward crankshaft bearing opening 50 would be formed. This recess could accommodate the free end of the crankpin 42. The use of the aperture 41 is beneficial because it permits the crankshaft 44 to project through the shuttle 34, whereby additional crankshaft bearings and crankpins may be made a part thereof, such as, for example, to cooperate with another set of adjacent pistons.

The crankpin 42 has a pair of conjugate drive members or "pinion sectors" 52, 54 rotatably associated therewith when the crankshaft 44 is in place in the bearing opening 50, as is more clearly shown in FIGS. 2 through 5. With the crankshaft 44 positioned within the opening 50 and the crankpin 42, including the conjugate drivers 52 and 54, positioned within the aperture 41 of the yoke portion 40, the conjugate drivers 52 and 54 mesh with the conjugate bearings 46 and 48, which capture the crankpin 42 and the conjugate drivers 52 and 54 therebetween. The crankpin 42 is isolated from contact with the periphery of the yoke portion 40 and instead bears upon bearing surfaces 56 and 58 of the conjugate drivers 52, 54. As can be appreciated, this arrangement prevents the crankpin 42 from bearing upon the yoke portion 40 directly and permits the fitting of the crankpin 42 to the aperture 41 within manufacturing tolerances. One should further note that the shuttle 34 is confined to a rectilinear path by the cylinders 16, 18 and the pistons 26, 28, rather than by an independent guide acting upon the shuttle 34 proximate the yoke portion 40. Of course, the motion conversion apparatus of the present invention could be used on any application requiring conversion between rotary and linear reciprocating motion and, on those applications not requiring pistons, a guide may be provided. Even in the embodiment shown, a guide could be employed to further insure rectilinear motion of the shuttle 34 and relieve the pistons and cylinders from side loading forces.

As can be seen, the conjugate bearings 46, 48, which include "teeth" or undulations 66, 68 formed on tracking surfaces thereof, and the conjugate drivers 52, 54, which include "teeth" or undulations 70, 72 formed on tracking surfaces thereof, mesh together in conjugation throughout the range of motion of the apparatus and thus their combination could be denominated a conjugate drive. It should be noted that the present invention is not intended to be directed to traditional involute gearing with tip/root clearance. FIGS. 1–5 depict concentric, tri-lobed, conjugate drivers 52 and 54 and mating, conjugate bearings 46, 48 which have an average pitch line inclined from the perpendicular of the direction of reciprocating motion. Numerous other configurations for the conjugate drivers and the conjugate bearings may be selected, as described further below.

In order to lubricate the conjugate drive (i.e. the conjugate drivers 52, 54 and the bearings conjugate 46, 48), the piston device 10 is provided with a lubrication system including a gallery 43 which extends longitudinally through the crankshaft 44 and the crankpin 42 and which forms a conduit for lubricating fluid supplied under pressure from a source, such as a pump (not shown). The crankpin 42 has a bore 45 communicating with the gallery 43 and extending radially outwardly from the gallery 43. The conjugate drivers 52, 54 have orifices 55, 57 extending therethrough from the bearing surfaces 56 and 58 to the undulations 70, 72. The orifices 55, 57 are positioned such that they are alignable with the bore 45 as the crankshaft 44 rotates and the conjugate drivers 52, 54 pivot about the crankpin 42 for a purpose to be described hereinafter.

Figure 2:
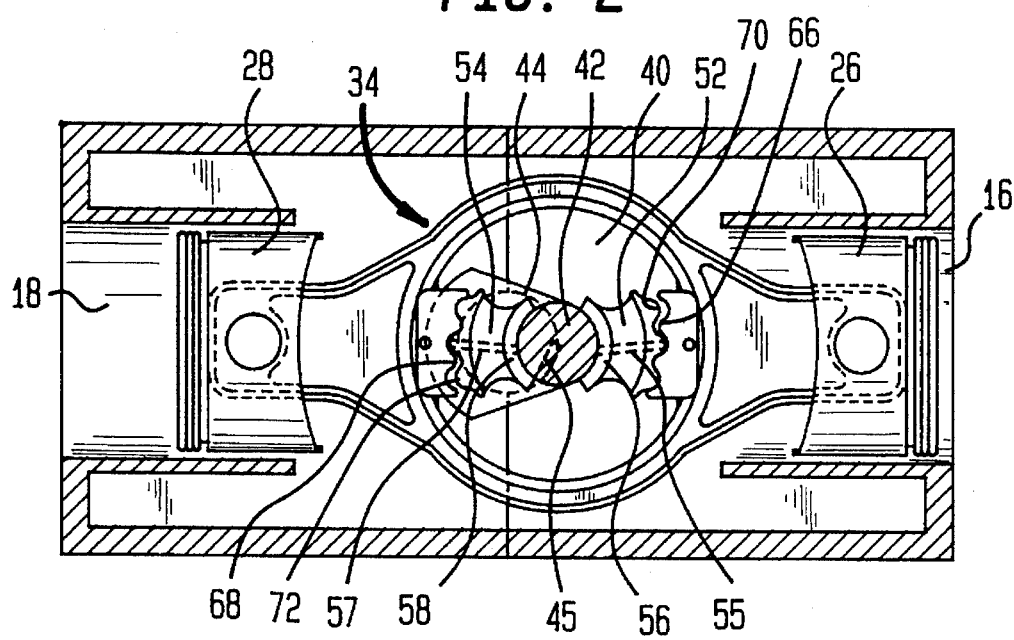
FIGS. 2–5 are a series of schematic elevational views of an embodiment of the present invention as it is moved through a portion of its range of motion.
Figure 3:
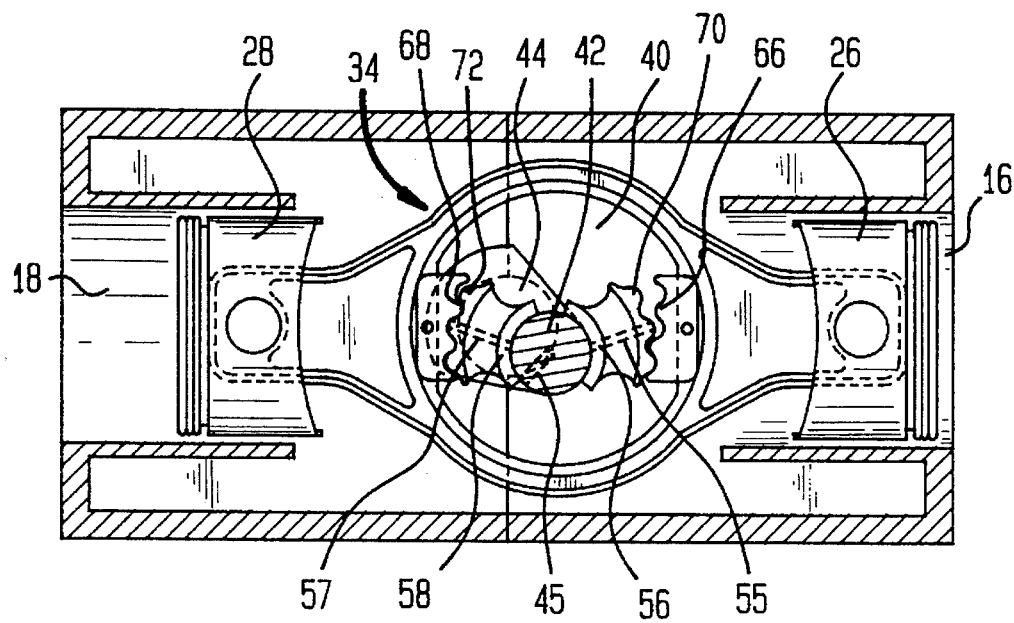
Figure 4:
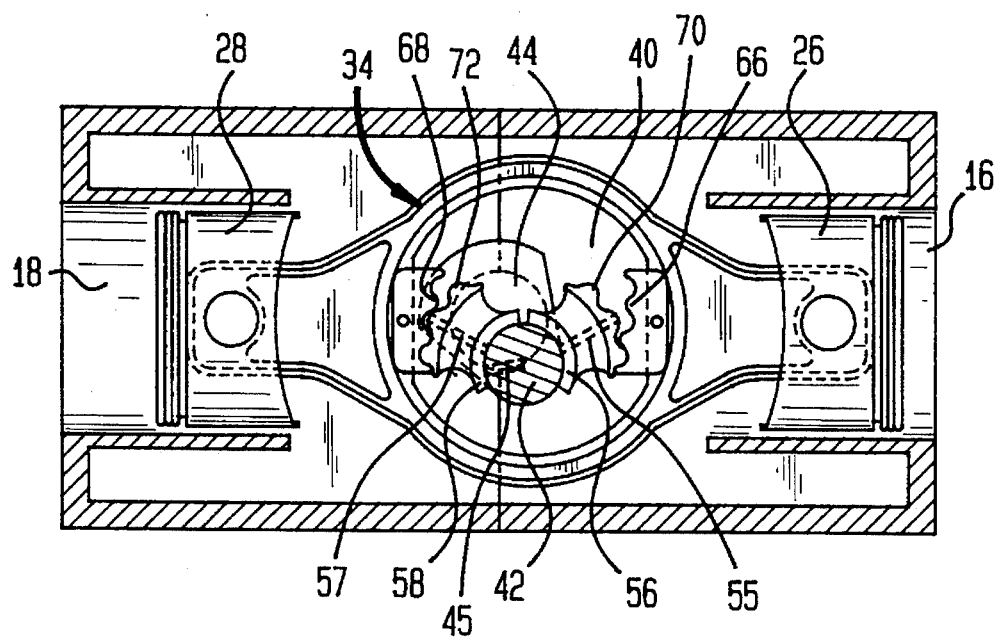
Figure 5:
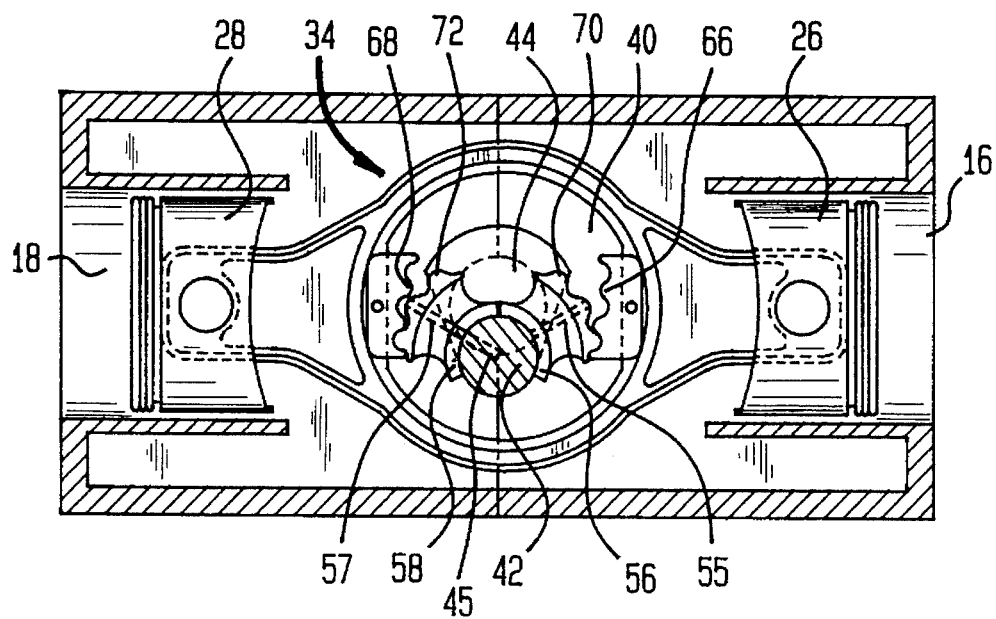

FIGS. 2–5 show the present invention at four different positions during the travel of the crankshaft 44 through 90 degrees of rotation. FIG. 2 shows the crankpin 42 at 0 degrees relative to the axis of the cylinder 16 (180 degrees relative to cylinder 18). FIG. 3 shows the crankpin 42 at 30 degrees. In FIG. 4, the crankpin 42 is at 60 degrees; and, in FIG. 5, the crankpin 42 is at 90 degrees.

As the crankshaft 44 rotates, the crankpin 42 moves up and down within the yoke portion 40 relative to the axis of the cylinders 16, 18 (i.e., in a vertical direction). The horizontal component of crankpin 42 motion is translated into the rectilinear motion of the shuttle 34. The crankpin 42 is captured between the bearing surfaces 56, 58 of the conjugate drivers 52, 54 and is therefore prevented from contacting the interior periphery of the aperture 41. The conjugate drivers 52, 54 pivot about the crankpin 42 as the crankshaft 44 rotates, the conjugate bearings 46, 48 being immovable in the direction perpendicular to the linear path of the shuttle 34 and the pistons 26, 28. The conjugate drivers 52, 54 pivot in opposite directions and can therefore be said to be counter-rotating. The crankpin 42, assuming that it has an axial offset "r" from the crankshaft 44, causes a reciprocating linear motion of the shuttle of magnitude 2r, ranging from –r to +r.

As the crankshaft 44 rotates, the lubricating fluid travels through the gallery 43, is diverted to the outer surface of the crankpin 42 through the bore 45 and lubricates the interface between the outer surface of the crankpin 42 and the bearing surfaces 56, 58 of the conjugate drivers 52, 54. As the orifice 57 of the conjugate driver 54 comes into alignment with the bore 45 (see FIG. 5), the lubricating fluid flows from the bore 45 into the orifice 57. From the orifice 57, the lubricating fluid is delivered to the interface between the undulations 72 of the conjugate driver 54 and the undulations 68 of the conjugate bearing 48. As the crankshaft 44 continues its rotating motion, the bore 45 comes into alignment with the orifice 55 of the conjugate driver 52 so that the lubricating fluid can be supplied to the interface between the undulations 70 of the conjugate driver 52 and the undulations 66 of the bearing conjugate 46.

It can be appreciated that the lubrication system not only reduces friction at the interface between the conjugate bearings 46, 48 and the conjugate drivers 52, 54 and between the crankpin 42 and conjugate drivers 52, 54; but it also contributes in minimizing backlash and preventing scuffing by creating a thin film of lubricating fluid between the conjugate bearings 46, 48 and the conjugate drivers 52, 54, respectively, thereby compensating for inadvertent gaps and spaces resulting from manufacturing tolerances and/or wear and tear of the conjugate driver.

It should be apparent that the lubrication system can be configured in various ways. For example, the orifices 55, 57 may extend through the conjugate drivers 52, 54 adjacent an end thereof, rather than intermediate the opposed ends of the conjugate drivers 52, 54 as shown in FIGS. 1–5. The orifices 55, 57 may also communicate with valleys between the undulations 70, 72, rather than with their peaks as shown in FIGS. 1–5. Furthermore, the lubrication system can be configured in such a way that a continuous, rather than intermittent, flow of lubricating fluid is provided to the interface between the conjugate drivers 52, 54 and the conjugate bearings 46, 48.

Figure 10:
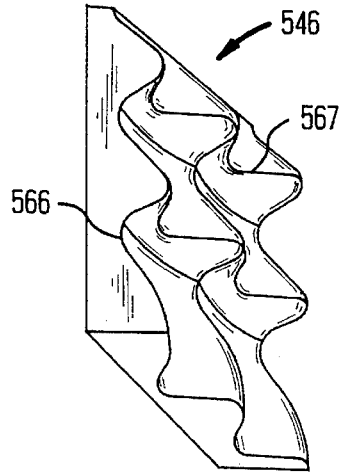
FIG. 10 is a perspective view of a conjugate bearing in accordance with a sixth exemplary embodiment of the present invention.
Figure 11:
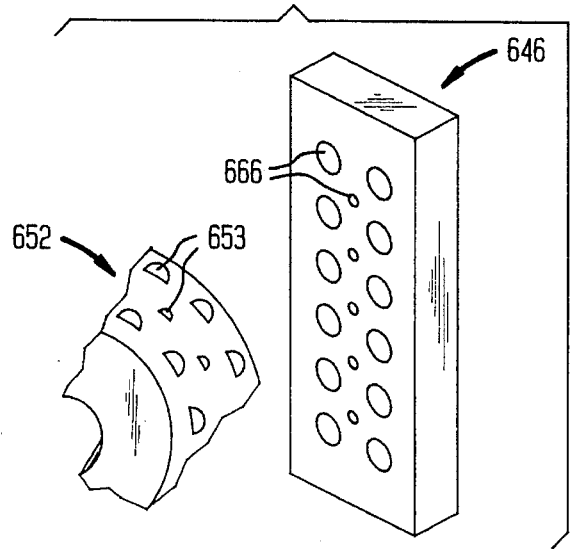
FIG. 11 is a perspective view of a conjugate bearing and mating conjugate driver in accordance with a seventh exemplary embodiment of the present invention.
Figure 12:
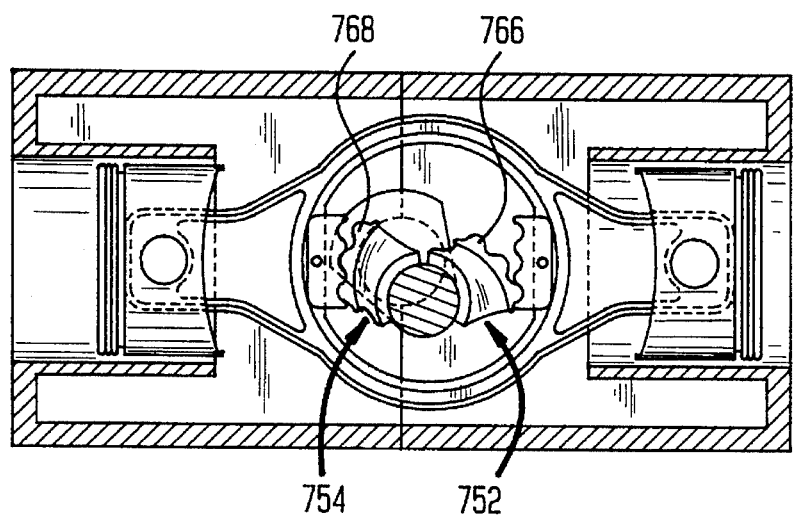
FIG. 12 is a schematic elevational view of a reciprocating piston device employing a conjugate driver and mating conjugate bearing in accordance with an eighth exemplary embodiment of the present invention.
Figure 13:
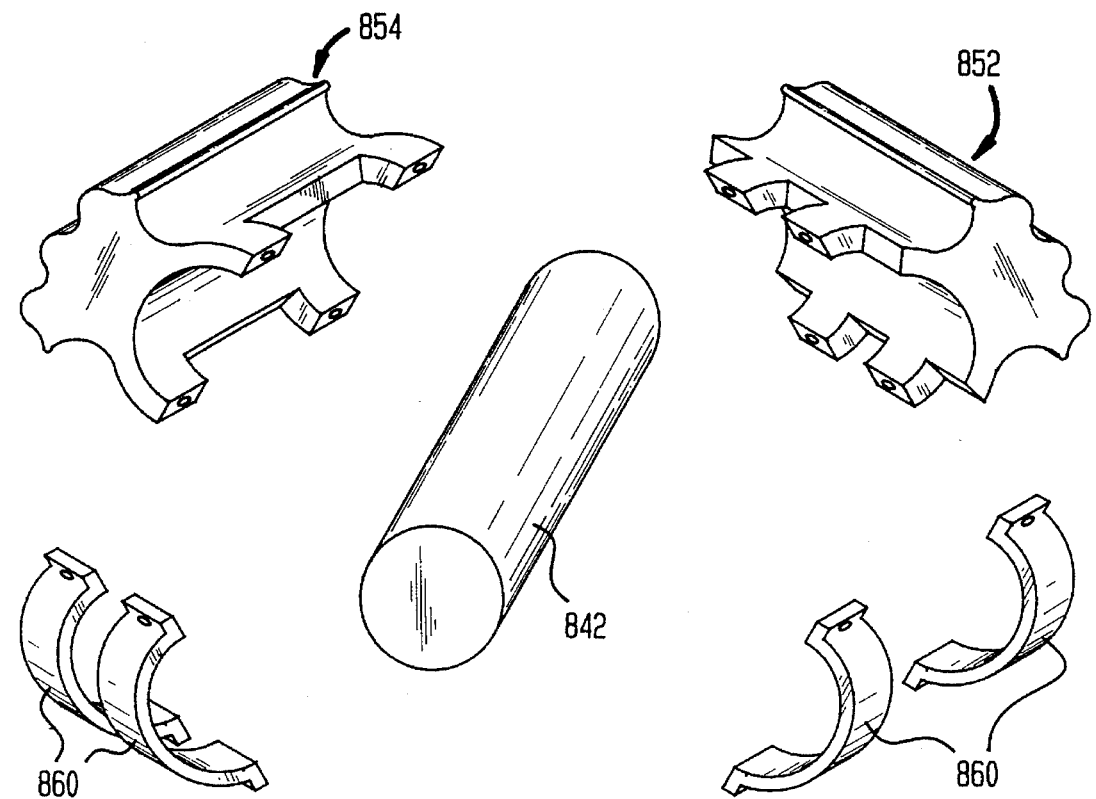
FIG. 13 is an enlarged, exploded, perspective view of a ninth exemplary embodiment of the present invention.
Figure 14:
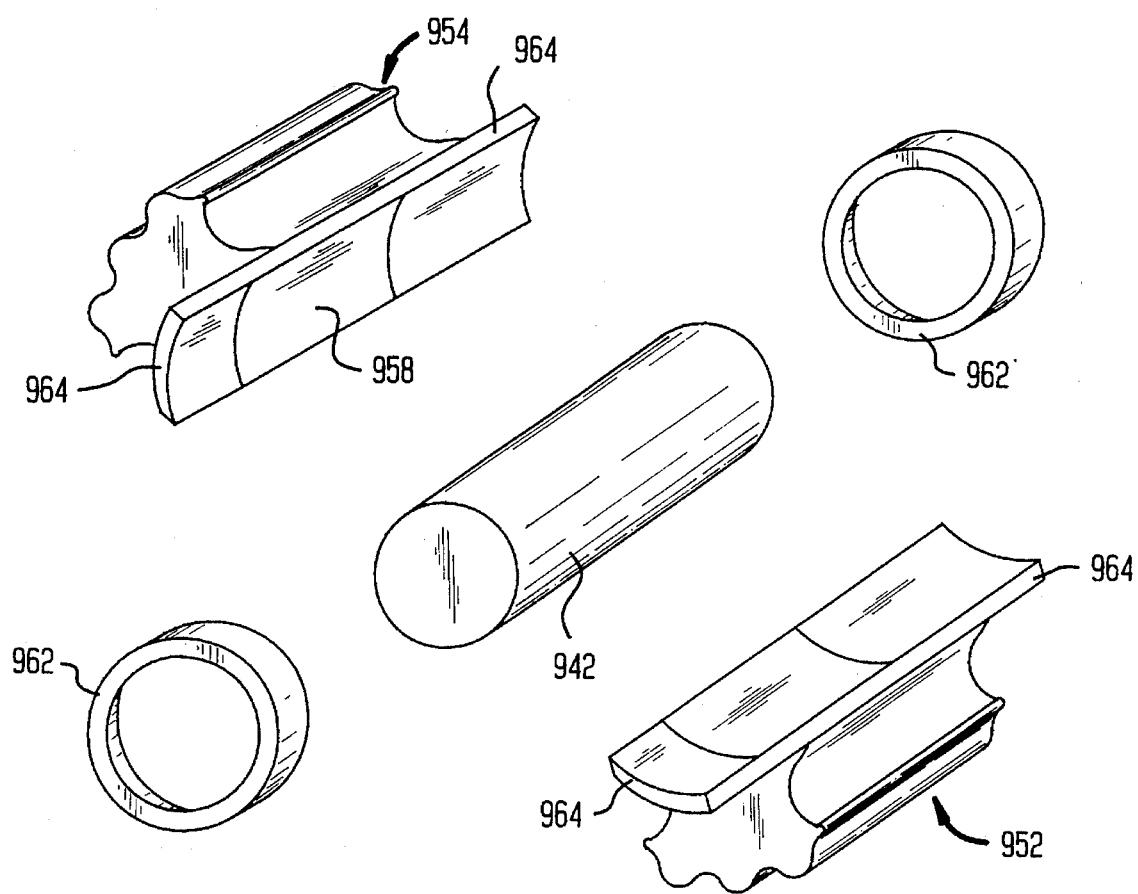
FIG. 14 is an enlarged, exploded, perspective view of a tenth exemplary embodiment of the present invention.

FIGS. 6–11 depict various conjugate bearing trackable profile shapes, while FIGS. 12–14 depict various conjugate driver trackable profile shapes. In FIGS. 6–14, a numbering convention is employed wherein elements shown therein having a function or structure in common with a counterpart in previously discussed FIGS. 1–5 are given the same number incremented by 100 in each succeeding embodiment. It should be appreciated that there is an infinite variety of possible profiles.

Figure 6:
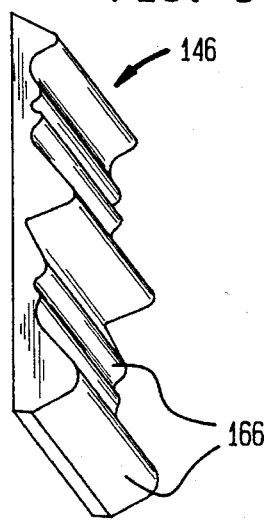
FIG. 6 is a perspective view of a conjugate bearing in accordance with a second exemplary embodiment of the present invention.
Figure 7:
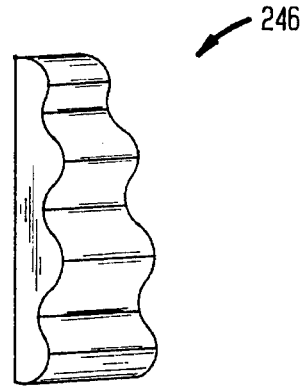
FIG. 7 is a perspective view of a conjugate bearing in accordance with a third exemplary embodiment of the present invention.

With reference initially to FIG. 6, a straight conjugate bearing 146 has "teeth" 166 of varying height and shape. Given this degree of variability, the "teeth" 166 may be more generally described as "undulations" in the tracking surface of the sector 146 relative to a selected base plane 168 (i.e., any selected plane or surface of reference). Such variations permit varying the frictional interaction between the rack and the sector, as well as varying load carrying potential.

Figure 8:
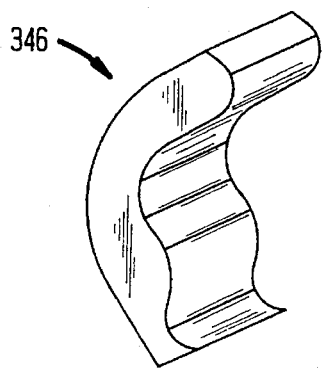
FIG. 8 is a perspective view of a conjugate bearing in accordance with a fourth exemplary embodiment of the present invention.
Figure 9:
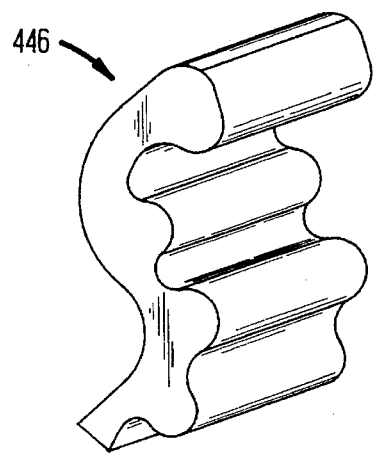
FIG. 9 is a perspective view of a conjugate bearing in accordance with a fifth exemplary embodiment of the present invention.

Referring now to FIGS. 7–11, FIG. 7 shows a straight, uniform undulation bearing conjugate 246 which is tapered in width. FIG. 8 depicts a simple curved conjugate bearing 346 with substantially uniform undulation height. FIG. 9 illustrates a conjugate bearing 446 with substantially uniform undulation height but in a compound "S"-shape. FIG. 10 shows a straight, uniform conjugate bearing 546 having an undulation wave 567 across the width of the bearing (i.e., secondary undulations disposed at an angle relative to primary undulations 566). FIG. 11 depicts a straight conjugate bearing 646 with dimples 666 of two sizes and a mating conjugate driver 652 with pimples 653.

As one can appreciate, FIGS. 6–11 are merely samples from an infinite set. The conjugate bearings need not be identical, nor do the conjugate drivers have to be identical. Since the drivers have an undulation shape which tracks upon the profile of the bearings, the driver undulation shape has the same degree of variability as the bearing shape.

Referring to FIG. 12, it can also be seen that the conjugate driver undulation 766, 768 can be eccentric relative to the axis of rotation of the conjugate drivers 752, 754. FIGS. 2–5, on the other hand, illustrate concentric sectors.

FIG. 13 shows a pair of tri-lobed conjugate drivers 852, 854 and associated crankpin bearing retainer caps 860. The bearing retainer caps 860 may be used to affix the conjugate drivers 852, 854 via bolts or other conventional means to the crankpin 842 while permitting rotation relative thereto.

FIG. 14 shows retainer rings 962 adapted to embrace tabs 964 which project from the bearing surfaces 956, 958 for the purpose of retaining the conjugate drivers 952, 954 on the crankpin 942. It should be observed that in the embodiments of the present invention shown in FIGS. 1–12, there is no means employed for retaining the conjugate drivers 52, 54 in association with the crankpin 42 other than their mechanical fit between the crankpin 42 and the respective conjugate bearings 46, 48. Accordingly, the conjugate drivers 52, 54 are freely rotatable about the crankpin 42 through 360 degrees and articulate independently of each other over a range determined by the respective number of degrees each driver subtends.

Figure 15:
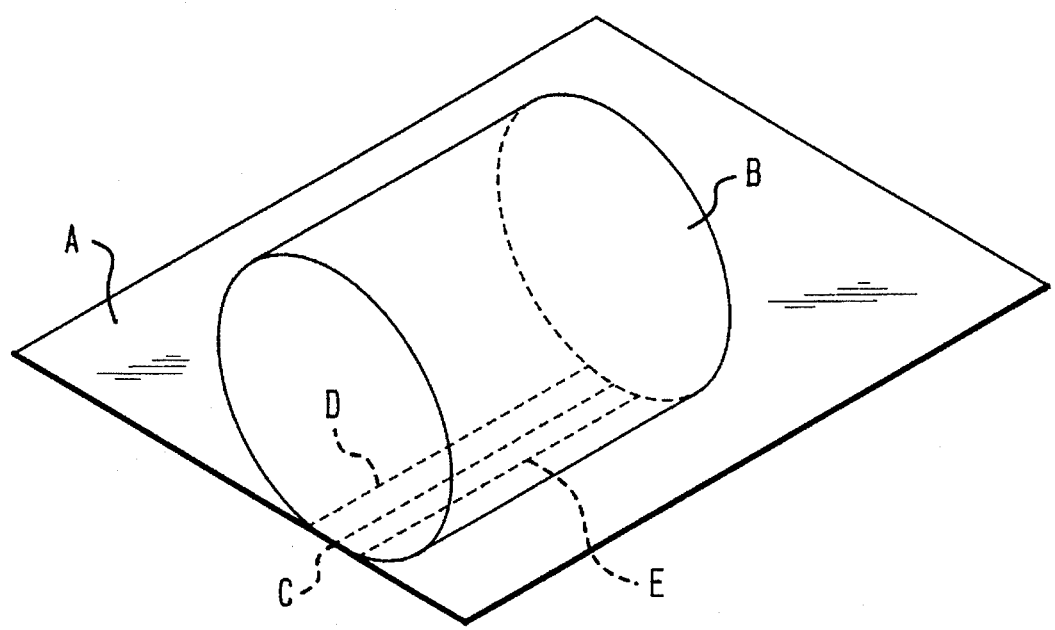
FIG. 15 is a perspective view of a cylindrical roller contacting a flat surface.

The above-described conjugate drive apparatus provides several functional advantages over a roller bearing riding upon a flat surface or traditional gear shapes that otherwise might be used to intermediate between the crank and shuttle. For example, a roller bearing or wheel riding upon a flat surface could be depicted as shown in FIG. 15. In FIG. 15, the flat bearing surface A is tangent to the circumference of the wheel or roller B. As such, there is a high degree of divergence of the two surfaces with greater divergence associated with smaller circumference. If the wheel and flat bearing surface were non-deformable and/or there is no pressure urging them together, then there would be line contact between the wheel and bearing surface, as depicted by dotted line C. If the wheel is urged toward the bearing surface, and the materials exhibit normal elastic behavior, the elasticity of the materials result in a deformation in both such that there is a flattening out of the wheel and a depression of the flat surface resulting in an increase in contact area as represented by the area between dotted lines D and E. In the case of steel or other hard metals, the degree of deformation will be microscopic and will depend upon the modulus of elasticity of the material and the compressive force applied.

Figure 16:
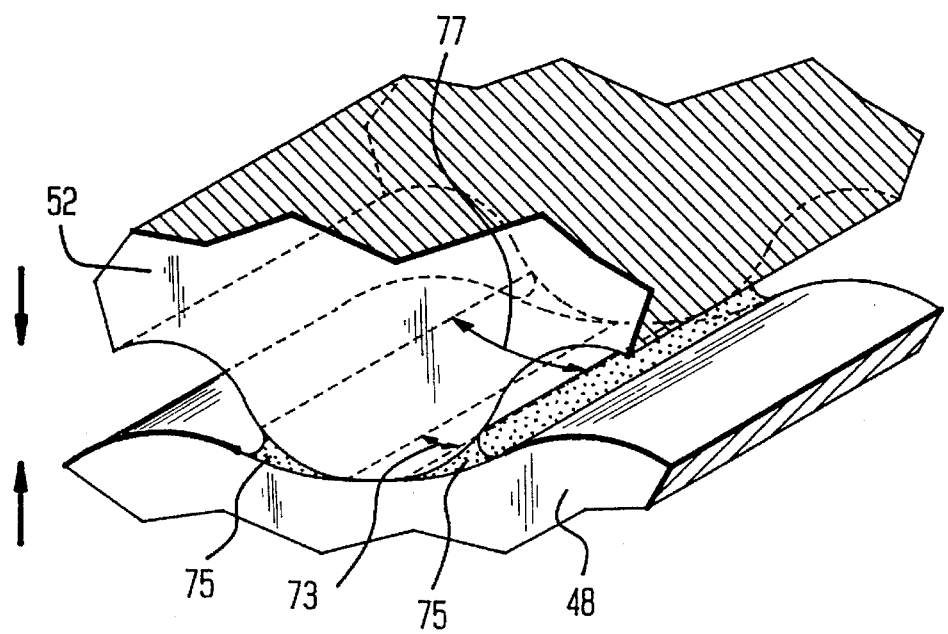
FIG. 16 is an enlarged segment of the conjugate drive of the present invention showing contact between a conjugate driver and a bearing conjugate.

It can be observed in FIG. 16 that impinging curved surfaces sharing a similar average radius and direction of curvature generate a relatively wide band of effective contact under loading forces. It should be understood that in the unloaded condition, similar but different curves will touch at only along a single line. For example, if a cylinder is placed within a slightly larger cylinder, there can only be line contact between the cylinders at any one time (assuming no deformation). Deforming compressive forces alter this relationship significantly. FIG. 16 shows a segment of a conjugate driver, e.g., 52 of FIG. 1 impinging upon a mating portion of its corresponding conjugate bearing 46. The junction is under compressive force, as indicated by the converging arrows to the left of the drawing. Even though the curves describing the respective profiles of the conjugate driver 52 and the conjugate bearing 48 differ, they are similar. Thus, under compression, the deformation of the driver and the bearing results in an increase of contact area represented by the band spanned by the double-headed arrow 73. This area could be denominated the effective dry contact area under compression. The greater effective contact area experienced due to similar curved surfaces under load is a consequence of the fact that there is less distance between similarly curved surfaces than between, e.g., a curve and its tangent line. For a given deformation displacement due to metal elasticity, a larger portion of approximately parallel surfaces will come into contact than for clearly non-parallel surfaces.

Curved surfaces which tend toward parallelism are also more efficacious for establishing and maintaining a hydrodynamic wedge or film of lubricating oil between the mating surfaces. As illustrated in FIG. 16, hydrodynamic wedges of lubricant 75 not only prevent dry contact between the mating elements but also function to transfer compressive force between the converging surfaces, thereby distributing the compressive force over a greater area and increasing the effective contact area. This hydrodynamic effective contact area is illustrated by double-headed arrow 77. Both the dry effective contact area and the hydrodynamic effective contact area will vary with the compressive force and the speed of surface conjugation.

The present invention using a conjugate drive exhibits mating surfaces which are more closely parallel than a tangent line to a circle. Stated another way, the average radius over a number of degrees of the "tooth" projection of the conjugate driver and the average radius over the same number of degrees of the mating "tooth depression" in the bearing conjugate differ only slightly. In contrast, the radius of a wheel differs by an infinite amount over the radius of a straight line which is a radius of infinite length. The practical consequence of this approximate parallelism, which exists at least over short distances, is that the deformations associated with a given load and material composition result in a greatly increased effective contact area over that of a wheel on a flat surface. One might also note that wheels, with their limited contact, concentrate the deformation forces along a narrow band of contact which results in metal fatigue and/or deformation beyond the elastic limit resulting in permanent deformation at positions of high compression (e.g., flattening of the wheel or bellying of the flat surface). In addition, at points in the cycle where there is light or no load on the wheel/surface interface, there can be a loss of contact or slippage such that the wheel fails to track over the bearing surface.

If conventional gearing were applied at the conjugate drive/bearing conjugate interface it would partially solve the problem of a lack of tracking and slippage associated with wheels or rollers by exhibiting the gross mechanical interaction of interdigitation, but presents another set of problems. Conventional gearing typically utilizes a first rotatable member rotating about a fixed axis and having a plurality of teeth. The teeth of the first rotatable member interdigitate with the teeth of either a second rotatable member or a linearly moving rack. The teeth of the first (driver) member "paddle" against the teeth of the second (driven) member such that force is delivered by the faces of the driver gear teeth to the faces of the driven gear teeth in a direction tangent to the pitch line of the driver gear. A clearance is provided between each gear tooth tip of the first gear and the corresponding root fillet of the mating gear. There is no contact between tip and root.

In contrast, the motion conversion apparatus of the present invention is intended to transmit force between a linearly reciprocating shuttle and the crankpin of a rotating crankshaft. This force is transmitted through the trackable profile interface of the conjugate driver and conjugate bearing. The transmission of force in the present invention has significant components normal to the driver/bearing interface. Thus, the conjugate profiles are urged into compression against one another. "Paddling" type interdigitating gear teeth are not a suitable alternative for bearing compressive loads, owing, at least partially, to the clearance gap present at the tip/root interface. If interdigitating gear teeth are subjected to the forces encountered by the conjugated profiles of the present invention's motion translator, the interdigitating teeth of each gear would be urged toward the tip/root gap of the other gear, thereby causing a wedging action of the interdigitating teeth. This successive wedging action creates tremendous friction and an unacceptable amount of wear and could not be used in a workable device. Conventional gearing has inherent clearance and, thus, loss of contact and slippage. As described, the tip/root gap of conventional gearing does not provide an adequate load bearing support surface and indeed represents a "loss of contact". In this respect, conventional gearing exhibits an intermittent contact surface in contrast to the continuous contact surface of the conjugate drive (due to the intermittent loss of contact between tip and root).

As can be appreciated from the above description of FIGS. 15 and 16, the effective area of contact between the conjugate driver and the conjugate bearing of the present invention is substantially increased over the line contact of a roller bearing (or wheel) on a tangent surface. This results in the potential of the present invention to endure greater typical primary normal loading forces, thereby increasing its power density. The arrangement depicted herein can support greater loading forces directed along the line perpendicular to the pitch line than gear shapes which are intended to transfer torsional forces acting parallel to the pitch line. The trackable profiles of the conjugate drivers, e.g., 52, 54 and bearings conjugate 46, 48 constitute the actual pitch lines and are therefore tangible rather than being an intangible, abstract line, as in conventional gear teeth. The trackable profiles can therefore be denominated "pitch surfaces".

After all the various embodiments of the conjugate drive as disclosed herein and as disclosed herein are considered, it should be apparent that the conjugate drivers and conjugate bearings 52, 54 and 46, 48 can be configured in a variety of ways. In each instance, however, it is an objective to prevent scuffing, to provide an adequate load bearing support surface and improved lubrication. Scuffing of the surfaces is avoided when the drivers 52, 54 track along the profiles of the bearings 46, 48 without loss of contact or slippage throughout the range of motion of the device. Bearings conjugate 46, 48 thus constitute trackable profiles with respect to the conjugate drivers 52, 54. In addition, one could observe that the total circumferential length of the trackable profile of each of the bearings 46, 48 equals the total circumferential length of the corresponding driver 52, 54 which tracks over it. This is true for all embodiments.

Figure 17:
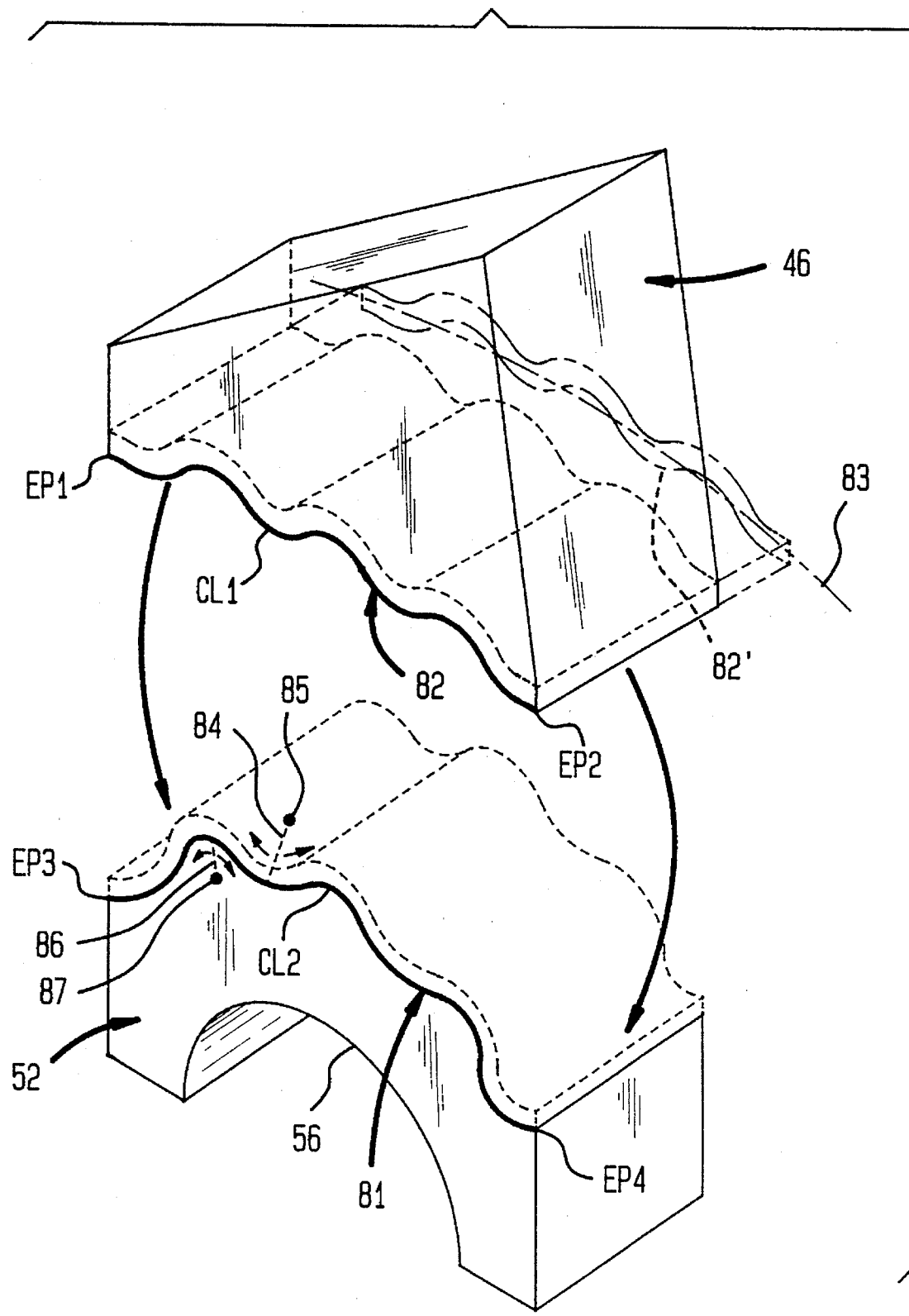
FIG. 17 is an enlarged view of a conjugate drive and mating bearing conjugate illustrating diagrammatically the relationship between the respective mating surfaces.

FIG. 17 illustrates an embodiment of the conjugate drive of the present invention like that shown in FIG. 1 and depicts the relationship between the conjugate driver outer surface 81 (surface extending from boldface line CL2) and the outer surface 82 of the bearing conjugate 46 (surface extending from boldface line CL1). Given a particular undulation pattern on either member, a mating trackable profile may be generated on the other. The undulation pattern of the bearing conjugate 46, for example, could be described as a continuous series of displacements above, on and below a reference surface. An end-on cross-sectional view of this surface is depicted by dotted line 82' which is a projection of the surface contour or profile of the bearing conjugate outer surface 82. Dotted line 82' can be defined as a series of displacements above, on and below a reference line 83. In FIG. 17, the undulation pattern of the bearing conjugate surface 82 is translated or superimposed upon the generally arcuate shape of the conjugate driver 52 to give the resultant surface contour 81. The undulations in the conjugate driver 52 can be defined as a series of displacements above, on (zero displacement) and below a reference surface associated with the conjugate driver, (not shown for simplicity of illustration), e.g., a cylinder section parallel to the conjugate driver crank bearing surface 56. The surface contour 82 has a circumferential length CL1, as measured between end points EP1 and EP2. The circumferential length CL2 of the conjugate driver 52 surface 81 is measured between end points EP3 and EP4. CL1 is of equal length to CL2.

A physical analogy for this conjugation relationship is that the undulating pattern 82 of the conjugate bearing 46 is bent over the arcuate shape of the conjugate driver 52. It is not necessary that the conjugate driver's arcuate shape (i.e., its reference surface) be a simple cylinder, rather, it may embody a compound and complex curvature. Similarly, the reference line 83 may be straight, a simple curve or a compound, complex curve. The shapes of the respective reference surfaces are selected to control the motion of the crankpin 42 (see FIG. 1) relative to the shuttle 40. It should be observed that in translating the undulations from the conjugate bearing 46 to the conjugate driver 52, the exterior radii, e.g., 84, from center 85 associated with the driver profile, (outer surface 81) are lengthened while the interior radii, e.g., 86 from center 87, are shortened. With respect to certain profile shapes, such as, a compound complex curved surface, it is a simplification to associate a significant portion of the profile shape to a few radii. In that particular instance, the resulting profile curvature could be described as a chain of small arcs swept by numerous radii having distinct centers on either side of the profile.

Despite the change in radii, the overall circumferential length (which is represented by the boldfaced curvilinear line CL1, as measured between endpoint EP1 and endpoint EP2) of the trackable profile of the conjugate bearing 46 remains the same after translation onto the conjugate driver 52. The overall circumferential length which is represented by the boldfaced curvilinear line CL2, as measured between end point EP3 and end point EP4, is equal to CL1. Stated differently, if both surfaces were straightened, they would be the same length (i.e., CL1=CL2). Owing to this relationship, the surface of the conjugate driver 52 can track line-by-line over the surface of the bearing conjugate 46 without slippage and without clearance. With respect to terms such as "equal" and "no clearance", the inventor herein recognizes that these conditions are achievable in the real world only to the level of precision inherent in machine tools. However, objectives of "equality", "no clearance" and "no scuffing" are clearly distinguishable, both in fact and intent, from clearances, such as the root/tip clearance, that are designed in or provided for in conventional gearing.

Figure 18:
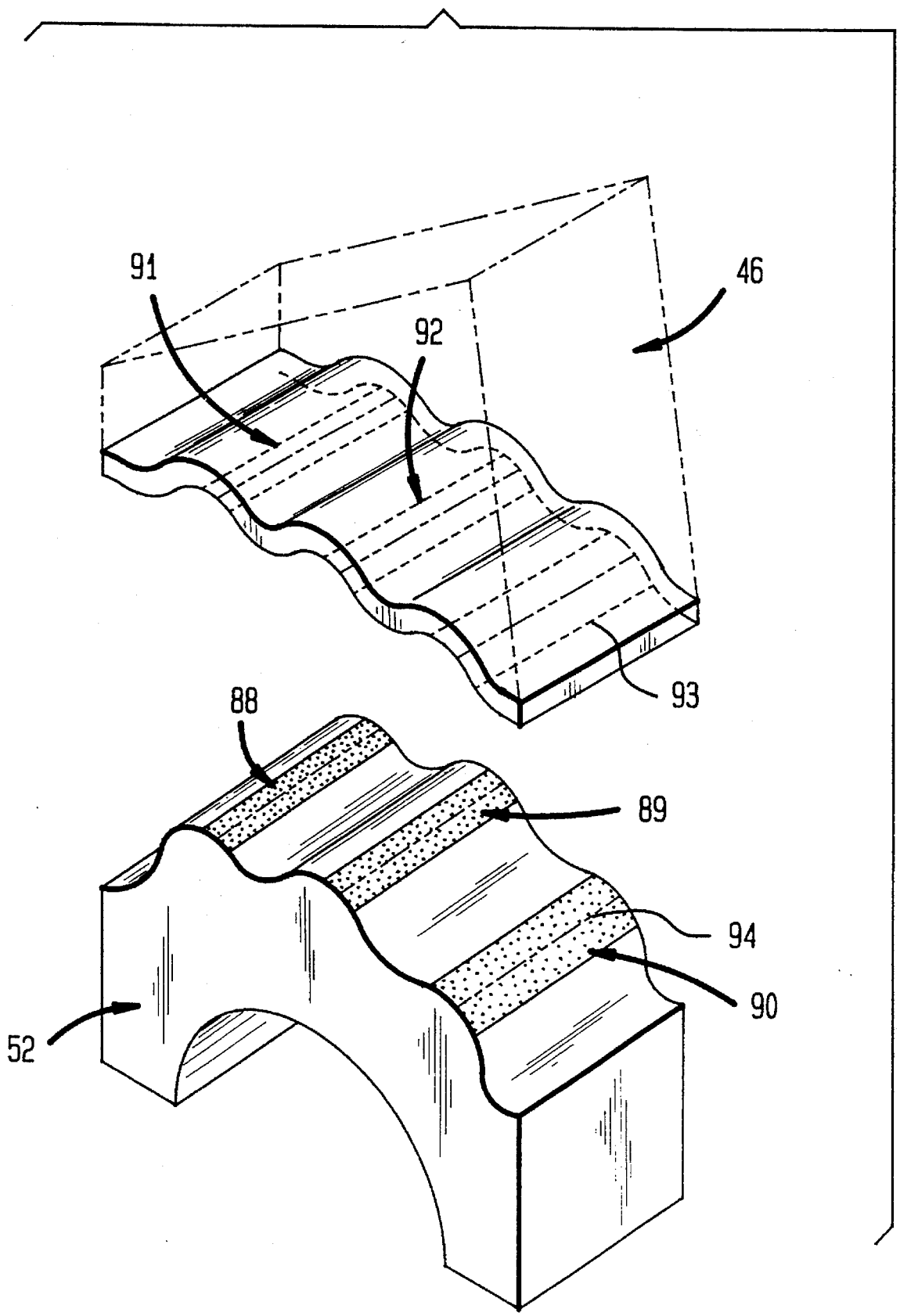
FIG. 18 is an enlarged view of the conjugate drive and mating bearing conjugate of FIG. 21 showing selected sequential contact areas.

FIG. 18 illustrates the increased dynamic effective contact area associated with the similar but unique curved surfaces of the mating conjugate driver 52 and bearing conjugate 46 (partially in phantom) under compression. The contact surfaces associated with 3 distinct positions occurring at distinct periods of time are illustrated. It should be understood that the three contact areas shown would not exist simultaneously, as shall be further explained below. In addition, FIG. 18 depicts the tracking relationship between the driver 52 and bearing 46 (no slippage, clearance or scuffing) More specifically, in the present invention with conjugate drive, the correlation of line-for-line contact between the bearing conjugate 46 and the conjugate driver 52 is, under working conditions, a correlation of bands or strips of contact, i.e., when the motion translator is operating and the interface is subjected to compressive loading forces. In addition, the effective contact area is increased by the presence of a lubricant. FIG. 18 shows a selected group of contact areas 88, 89, and 90 on the driver 52 associated with discrete points in time at discrete phases of a full range of travel of the conjugate drive under one set of operating conditions, e.g., engine under no load and running at 1000 RPMs. These contact areas on the driver 52 correspond with contact areas 91, 92 and 93 on the bearing 46. As illustrated, the effective surface contact areas will vary depending upon variations in loading forces experienced at different degrees in the cycle. During times of extremely high loading or overload, the dry contact area may be larger. When lightly loaded, e.g., at low RPM, the effective dry surface contact approaches line contact, but a more substantial effective contact area is maintained by the hydrodynamic effect of the lubricant. To illustrate the potential variations in the width of the effective contact area due to loading, area 90 is shown as being larger than area 88. To depict the distinction between the effective contact area, e.g., 90 and the line contact associated with dry unloaded operation, a dotted line 94 is drawn through each effective contact area shown. On account of its influence on the effective contact area, the lubricant may be denominated a "contact medium" or "constant contact medium". In operation, the effective surface contact area migrates along the interface between the driver 52 and the bearing 46 as the driver tracks over the bearing. This migration is uninterrupted due to the constant contact between the conjugated members (52, 46). One could also express this relationship by noting that a continuum of contact lines arranged along the entire circumferential length of the respective profiles of the conjugate driver and conjugate bearing may be said to exist. Further, the respective contact lines serially contact a corresponding contact line on the mating profile as the conjugate drive progresses through its range of motion. In this manner, the entire surface area of each of the profiles contribute to load transmission and may be said to be load transmitting surfaces. The contact areas shown in FIG. 18 represent the contact areas that would be present at three different times.

Figure 19:
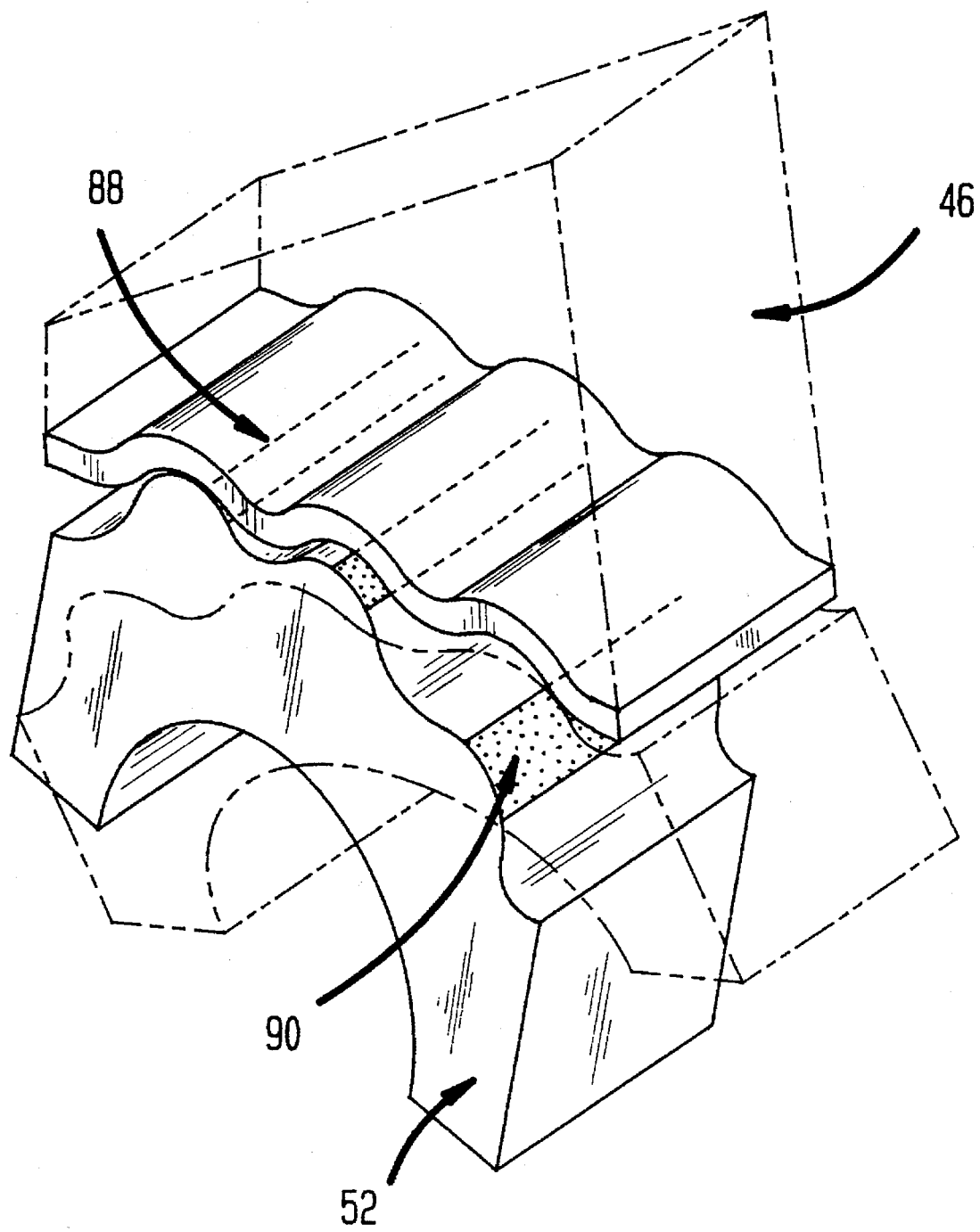
FIG. 19 is an enlarged view of the conjugate drive and mating bearing conjugate in two positions of conjugate motion.

FIG. 19 shows the rolling conjugated interaction of the bearing conjugate 46 and the conjugate driver 52. In a first position (indicated by solid lines) the driver 52 contacts the bearing conjugate 46 at contact area 88. When the driver has moved into a second position (indicated by dotted lines) the area 90 on the driver 52 will be in contact with the surface of the conjugate profile of the bearing conjugate 46. The correspondence of contact areas is constant for each itteration of the conjugate drive's motion. That is, for each cycle, there is a repetition of contact area correspondence.

As described in co-pending application Ser. No. 08/149,064, entitled Lubrication System for a Conjugate Drive Mechanism, filed Nov. 8, 1993, the maintenance of a hydrodynamic film of lubricant has notable beneficial effects and is readily achieved in the present invention with conjugate drive. If a quantum of lubricant is injected between the driver and the bearing before the area of contact and preferably at a point of low loading, it will be pushed along in front of the mating interface i.e., the migrating contact area through the range of travel.

It may be noted that the conjugate drive of the present invention has certain attributes of a wheel, in that it rolls smoothly over a support surface in line-for-line contact, without clearance gaps. It also has attributes of gears, in that the driver and the bearing exhibit a repetitive tracking mechanical interaction which prevents slippage. Unlike a gear system, there is no tip-to-root clearance or a multiple set of sequentially interrupted contact surfaces, Instead, the contact is continuous. The conjugate drive of the present invention also exhibits an increased contact area over either the wheel or the gear. One should further note that the tracking profiles of the conjugate drivers 52, 54 act as self-aligning components as they interface with their respective conjugate bearings 46, 48.

The conjugate bearings 46, 48 and the conjugate drivers 52, 54 may be formed of hardened steel or other materials as commonly used to form gears and may include surface treatments to reduce wear, friction and production costs (e.g., electroplating, nitriding, spray dispersement and, in general, any known applicable metallurgical or coating process). The weight of the bearings 46, 48 could be reduced by forming them as a multi-material matrix of aluminum and steel or other metal or non-metal matter. The crank bearing surfaces 56 and 58 of the conjugate drivers 52, 54 may be similarly enhanced by surface treatment or bonding with a friction-reducing bearing material.

Referring to FIGS. 20 and 21, a conjugate driver 1052 is divided into a lower member 1052a and an upper member 1052b. The lower member 1052a is rotatably mounted on a crankpin 1042. The lower member 1052a has a peripheral wall 1080 which extends beyond an upper surface 1082 of the lower member 1052a to form a socket 1084. Coil springs 1086 and a tubular nipple 1088 project from the upper surface 1082 within the socket 1084 for purposes to be described hereinafter. As can be seen in FIG. 20, the nipple 1088, which is fixedly mounted in a lower portion 1055a of an orifice 1055, includes an axial bore 1090 and a plurality of radial holes 1092 (only one of which is visible in FIG. 20) whose functions will also be described hereinafter.

The upper member 1052b has a solid plug 1094 which extends beyond a lower surface 1096 of the upper member 1052b. The plug 1094 has a size and shape which complements those of the socket 1084, whereby the plug 1094 is slideably received within the socket 1084 with sidewalls of the plug 1094 being in sealing (i.e., fluid-tight) engagement with the peripheral wall 1080 of the lower member 1052a. An upper portion 1055b of the orifice 1055 extends through the upper member 1052b, including the plug 1094. The upper portion 1055b of the orifice 1055 is sized and shaped such that it slidably receives the nipple 1088 of the lower member 1052a (see FIG. 21).

As can be seen in FIG. 21, the plug 1094 has a height which is slightly less than the depth of the socket 1084. Thus, when the plug 1094 is in its fully retracted position within the socket 1084 as shown in FIG. 21, the plug 1094 does not "bottom out" on the upper surface 1082 of the lower member 1052a; but, rather, the plug 1094 is suspended above the upper surface 1082 to create a space 1098 which is in communication with the radial holes 1092 of the nipple 1088 for a purpose to be described hereinafter. The space 1098 also accommodates the coil springs 1086, which are fully compressed by the plug 1094 when it is in its fully retracted position as shown in FIG. 16.

As the conjugate driver 1052 pivots about the crankpin 1042, the coil springs 1086 constantly urge the upper member 1052b of the conjugate driver 1052 against an associated conjugate bearing (not shown). If the conjugate drive becomes worn, the coil springs 1086 function to move the upper member 1052b from its retracted position depicted in FIG. 21 toward its extended position depicted in FIG. 22, thereby compensating for such wear and, as a result, reducing backlash and scuffing. As the pressurized lubricating fluid flows from the lower portion 1055a of the orifice 1055 to the upper portion 1055b of the orifice 1055 via the nipple 1088, a portion of the pressurized lubricating fluid is diverted into the space 1098 through the radial holes 1092 to thereby assist the coil springs 1086 in urging the upper member 1052b against its associated conjugate bearing. To maximize the force of the pressurized lubricating fluid, it may be desirable to provide an annular sealing member (not shown) between the sidewalls of the plug 1094 and the peripheral wall 1080 of the lower member 1052a and/or to provide for a continuous flow of lubricating fluid through the orifice 1055 and, hence, to the space 1098. Furthermore, the lubrication system can be configured in such a way that a continuous flow of lubricating fluid is supplied to the space 1098 while lubricating fluid is intermittently supplied to the interface between the conjugate driver 1052 and the associated bearing conjugate. If the lubricating fluid is continuously supplied to the space 1098 at a high enough pressure, then the coil springs 1086 could be eliminated.

It should be noted that the relative movement between the upper member 1052b and the lower member 1052a can be achieved in various ways. For example, magnetic and/or pneumatic means may be employed in conjunction with or instead of the coil springs 1086 and/or the pressurized lubricating fluid (i.e., the hydraulic urging means). Furthermore, the bearing conjugate, instead of or in addition to the conjugate driver 1052, can be divided into a pair of members, one of which would have undulations and would be movable relative to the other member.

Figure 23:
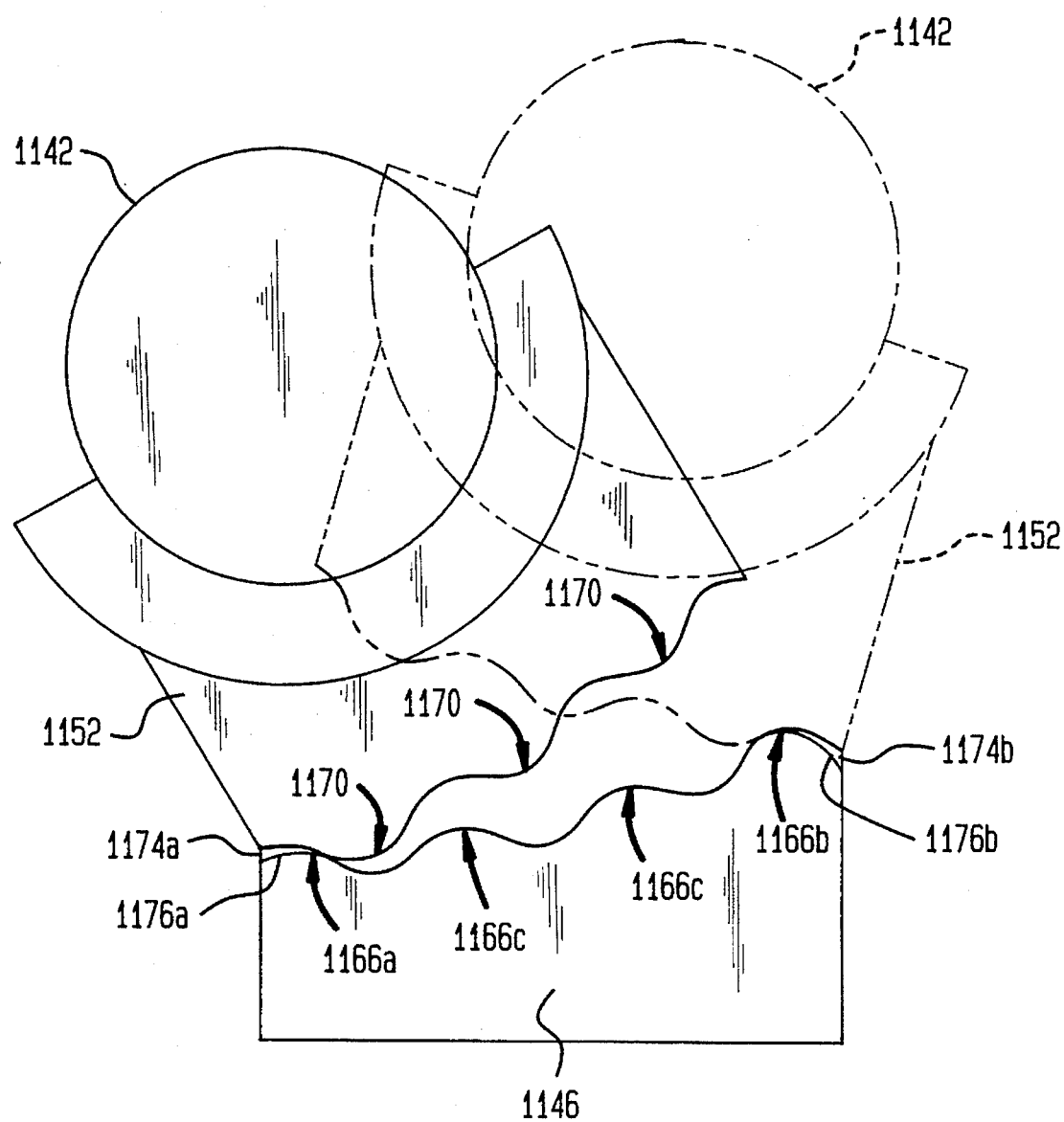
FIG. 23 is a schematic illustration of a twelfth exemplary embodiment of the present invention.

Referring to FIG. 23, a conjugate driver 1152 has a pre-defined range of pivotal movement relative to an associated bearing conjugate 1146, the range being delimited by two end points: one of which is represented by the solid line representation of the conjugate driver 1152 and the other of which is represented by the broken line representation of the conjugate driver 1152. With reference to the bearing conjugate 1146, it has exterior undulations 1166*a*, 1166*b* and interior undulations 1166*c*. Stop pads 1174*a*, 1174*b*, are provided on surfaces 1176*a*, 1176*b*, respectively, of the exterior undulations 1166*a*, 1166*b*, respectively. The stop pads 1174*a*, 1174*b* modify the profiles of the exterior undulations 1166*a*, 1166*b* so as to create increased surface engagement with their corresponding undulations 1170 of the conjugate driver 1152, thereby inhibiting the conjugate driver 1152 from moving beyond either of its end points and, as a result, reducing backlash and scuffing when the conjugate driver 1152 reaches such end points. In other words, the stop pads 1174*a*, 1174*b* provide improved contact between the conjugate bearing 1146 and the conjugate driver 1152, thereby increasing the effectiveness of the conjugate drive motion.

The stop pads 1174*a*, 1174*b* can be separate elements which are permanently and fixedly attached to the conjugate bearing 1146 and/or to the conjugate driver 1152. Alternatively, the stop pads 1174*a*, 1174*b* can be made integrally with the conjugate bearing 1146 and/or with the conjugate driver 1152. In addition, the stop pads 1174*a*, 1174*b* can be made from a material which is the same as or different from that of the conjugate bearing 1146 and/or the conjugate driver 1152.

It will be understood that the embodiments described herein are merely exemplary and that a person skilled in the art may make many variations and modifications without departing from the spirit and scope of the invention. For example, the present invention could be employed to convert curvilinear reciprocating motion to rotary motion and vice versa, as when a curvilinear guide is employed for governing the travel of the reciprocating element. All such variations and modifications are intended to be included within the scope of the invention as defined in the appended claims.

I claim:

1. A motion converter apparatus, comprising a shuttle movable in a reciprocating fashion along a rectilinear path, said shuttle having an aperture therein, one side of said aperture being defined by a first trackable profile having a first circumferential length and an opposite side of said aperture being defined by a second trackable profile having a second circumferential length; a rotatable crankshaft having a crankpin positioned within said aperture and rotatable in a circular path; and a pair of conjugate drivers rotatably mounted on said crankpin, one of said conjugate drivers including a first tracking profile having a third circumferential length, which is equal to said first circumferential length, and the other conjugate driver including a second tracking profile having a fourth circumferential length, which is equal to said second circumferential length, said first and second trackable profiles engaging said first and second tracking profiles, respectively, in a continuous conjugating manner as said crankpin rotates in said circular path, whereby the reciprocating rectilinear motion of said shuttle is continuously converted into the rotary motion of said crankpin or vice versa.

2. The apparatus of claim 1, wherein said first tracking profile has a first continuum of contact lines arranged along the entire circumferential length thereof such that said first contact lines serially contact their corresponding contact lines on said first trackable profile, and said second tracking profile has a second continuum of contact lines arranged along the entire circumferential length thereof such that said second contact lines serially contact their corresponding contact lines on said second trackable profile.

3. The apparatus of claim 2, wherein said first trackable profile constitutes a first pitch surface, said second trackable profile constitutes a second pitch surface, said first tracking profile constitutes a third pitch surface, and said second tracking profile constitutes a fourth pitch surface.

4. The apparatus of claim 3, wherein each of said conjugate drivers is laterally displaced along said crankpin axis such that throughout the range of motion of said crankshaft there exists at least one line perpendicular to said crankpin axis passing through both conjugate drivers.

5. The apparatus of claim 4, wherein said trackable profiles and said conjugate drivers restrict the motion of said crankpin along a predetermined path relative to said shuttle.

6. The apparatus of claim 5, wherein said conjugate drivers pivot upon said crankpin as said crankpin traverses said predetermined path.

7. The apparatus of claim 6, wherein conjugate drivers are counter-rotating.

8. The apparatus of claim 7, wherein said conjugate drivers are pivoted by engagement with said trackable profiles, said trackable profiles being substantially immovable in a direction perpendicular to said rectilinear path.

9. The apparatus of claim 8, wherein said trackable profiles have a linear average pitch line.

10. The apparatus of claim 9, wherein said trackable profiles have uniform undulations which mate with uniform undulations on said conjugate drivers.

11. The apparatus of claim 10, wherein said average pitch line is inclined from a line normal to said linear path.

12. The apparatus of claim 11, wherein said undulations are concentrically disposed on said conjugate drivers relative to the axis of rotation of said conjugate drivers upon said crankpin.

13. The apparatus of claim 12, wherein said conjugate drivers are alike.

14. The apparatus of claim 9, wherein said average pitch line of said trackable profiles are normal to said rectilinear path.

15. The apparatus of claim 14, wherein said trackable profiles have uniform undulations which mate with uniform undulations on said conjugate drivers.

16. The apparatus of claim 15, wherein said undulations are eccentrically disposed on said conjugate drivers relative to the axis of rotation of said conjugate drivers upon said crankpin.

17. The apparatus of claim 16, wherein said conjugate drivers are alike and said trackable profiles are alike.

18. The apparatus of claim 8, wherein said trackable profiles have a curved average pitch line.

19. The apparatus of claim 18, wherein said curved average pitch line is a simple curve.

20. The apparatus of claim 18, wherein said curved average pitch line is a compound curve.

* * * * *